Nov. 19, 1968   W. F. HARVEY ET AL   3,411,671
DISPENSING MECHANISM FOR A LIQUID AND A POWDER
Filed Sept. 13, 1967   4 Sheets-Sheet 1
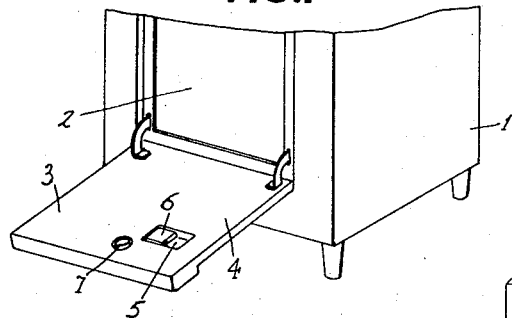
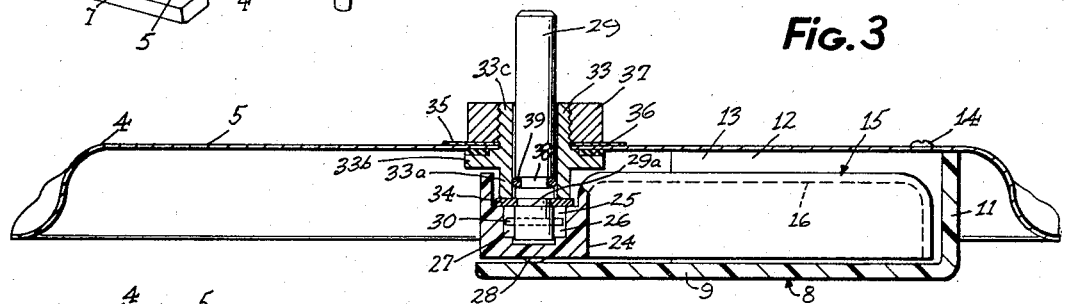
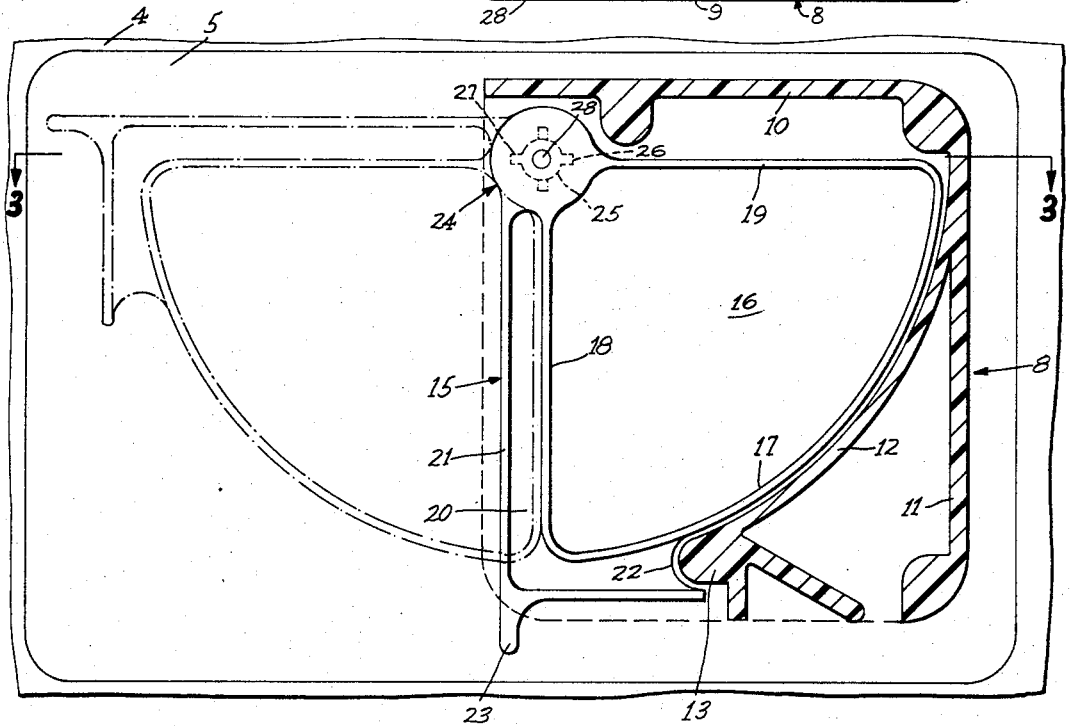
INVENTOR/S
WILLIAM F. HARVEY &
THOMAS W. DUNCAN,
BY *Melville, Strasser, Foster and Hoffman*
ATTORNEYS

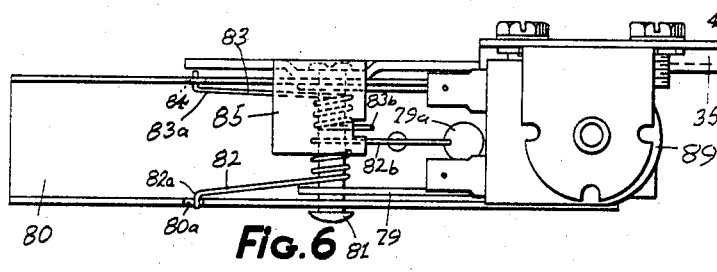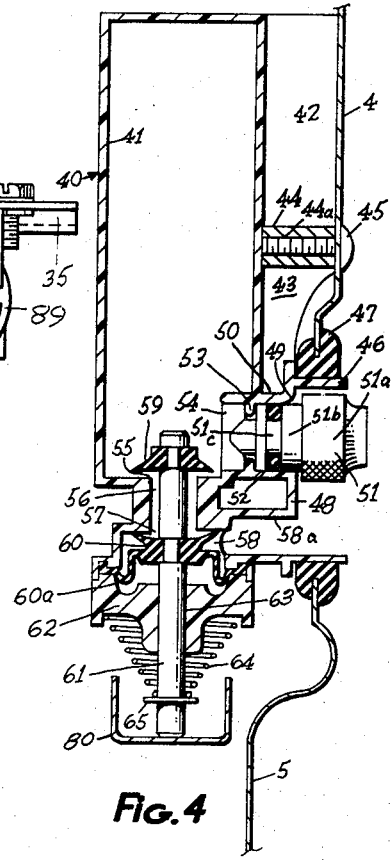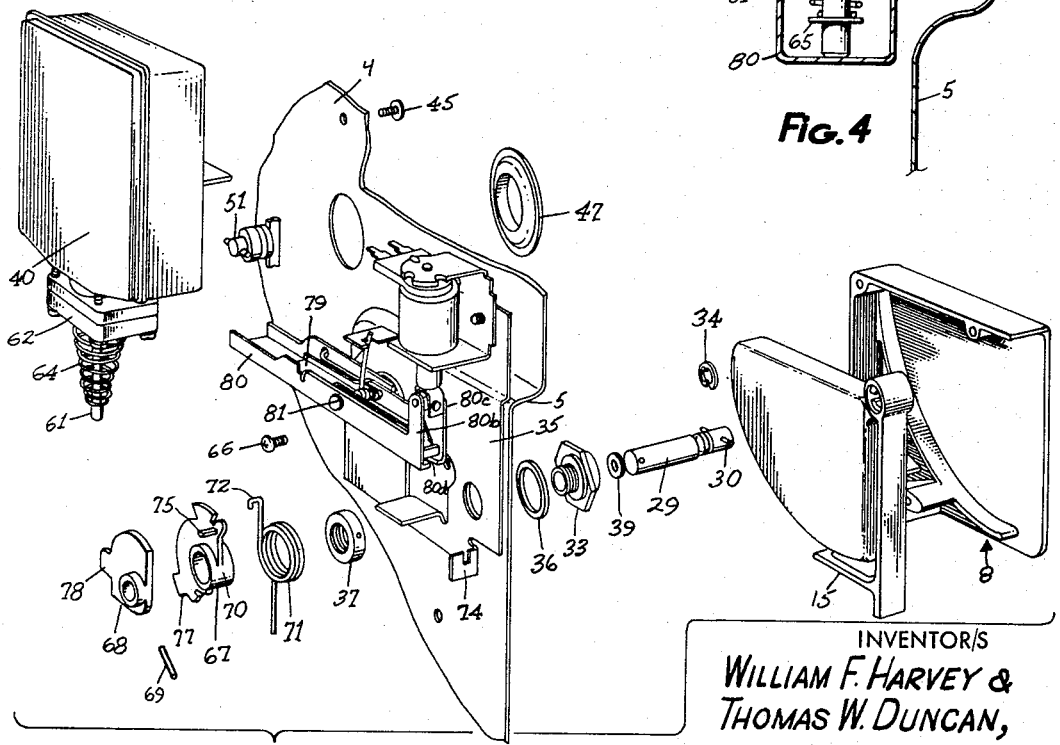

Nov. 19, 1968  W. F. HARVEY ET AL  3,411,671
DISPENSING MECHANISM FOR A LIQUID AND A POWDER
Filed Sept. 13, 1967  4 Sheets-Sheet 3

INVENTOR/S
WILLIAM F. HARVEY &
THOMAS W. DUNCAN,
BY Melville, Strasser, Foster and Hoffman
ATTORNEYS Nov. 19, 1968  W. F. HARVEY ETAL  3,411,671
DISPENSING MECHANISM FOR A LIQUID AND A POWDER
Filed Sept. 13, 1967  4 Sheets-Sheet 4
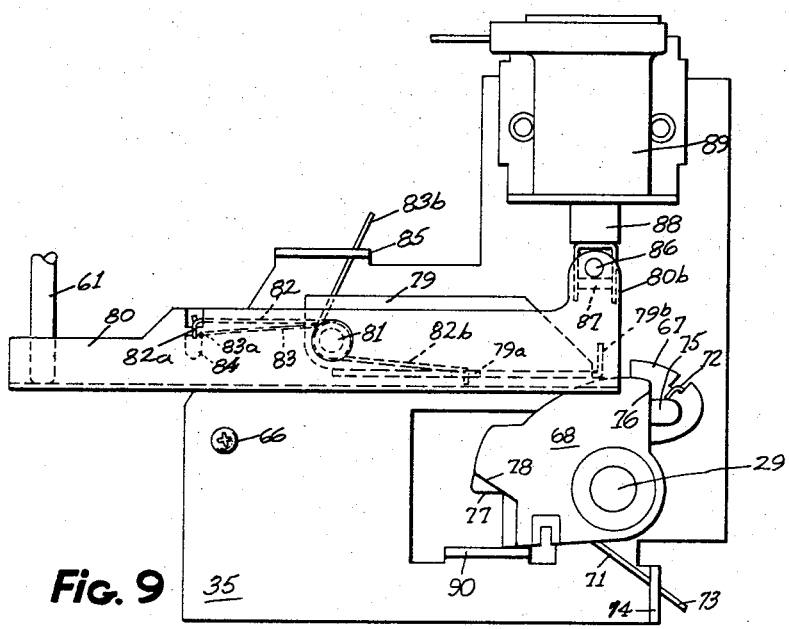
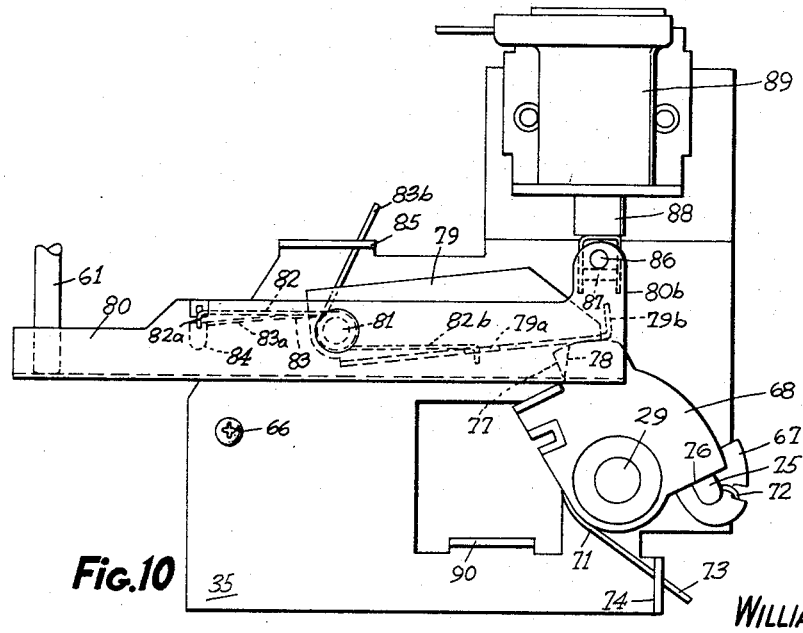
INVENTOR/S
WILLIAM F. HARVEY &
THOMAS W. DUNCAN.
BY Melville, Strasser, Foster and Hoffman
ATTORNEYS

United States Patent Office 3,411,671
Patented Nov. 19, 1968

3,411,671
DISPENSING MECHANISM FOR A LIQUID
AND A POWDER
William F. Harvey and Thomas W. Duncan, Fayette
County, Ind., assignors to Design and Manufacturing Corporation, Connersville, Ind., a corporation of
Indiana
Filed Sept. 13, 1967, Ser. No. 667,498
9 Claims. (Cl. 222—70)

ABSTRACT OF THE DISCLOSURE

A dispensing mechanism for appliances such as clothes and dishwashing machines comprising a cam operated dispenser unit for powdered or granulated materials and a plunger operated dispenser unit for metered amounts of liquid materials. Pivotally mounted arm means extend between the liquid dispenser unit plunger and the powder dispenser unit cam. A single solenoid actuates the arm means to bring about a simultaneous dispensing action by both the liquid and the powder dispensing units.

BACKGROUND OF THE INVENTION

Field of invention

The invention relates to a dispensing mechanism and more particularly to a timer-controlled means for releasing measured quantities of powdered or granulated material and metered amounts of liquid agent into the tub or vat of a washing machine or a dishwashing machine, at intervals coinciding with the desired parts of the cycle of operations of the machine.

Description of the prior art

Heretofore dishwashing machines and the clothes washing machines of either the front loading or the top loading types have been provided with sequential dispensers for granulated or powdered detergent. These sequential detergent dispensers are often actuated by a rotating shaft, and are generally divided into two or more compartments or chambers. The rotating shaft sequentially moves door means covering one or more of the chambers. Such a dispenser is described in the copending application in the name of Thomas W. Duncan and Charles N. Perin, Ser. No. 531,967, filed Mar. 4, 1966 now Patent No. 3,365,559 and entitled Dispensing Mechanism.

Similarly, dishwashing machines and clothes washing machines have been provided with timer actuated means for sequentially dispensing metered amounts of liquid agent. These means commonly comprise a reservoir for the liquid agent and a connected metering chamber. Valve means are located between the metering chamber and the reservoir, and between the metering chamber and a dispensing orifice. Valve stem or plunger means is provided which, in one operative position, closes the valve between the metering chamber and the dispensing orifice and opens the valve between the metering chamber and the reservoir. In its other operative position, the plunger closes the valve between the reservoir and the metering chamber and opens the valve between the metering chamber and the dispensing orifice, causing the liquid agent to be discharged into the machine vat. Such as dispenser is, for example, shown in United States Patent No. 2,959,341. Heretofore, when a dishwashing machine or a clothes washing machine was provided with both a liquid agent dispenser and a powdered or granulated detergent dispenser, separate actuating means was required for both dispensers, often entailing separate cam or switch means in the timer mechanism. In accordance with the teachings of the present invention, a dishwashing machine or clothes washing machine may be provided with a dispenser comprising a plunger operated liquid agent dispenser unit and a cam operated detergent dispenser unit operated by a common actuating mechanism comprising a single solenoid and a pivotally mounted articulated arm means. One end of the arm means actuates the plunger, while the other end of the arm means engages the cam. In this way a simplified actuating mechanism is provided, which is inexpensive to manufacture and easy to replace or repair.

SUMMARY OF THE INVENTION

While the teachings of the present invention are equally applicable to a clothes washing machine or similar appliance, for purposes of an exemplary showing, the invention will be described in connection with dispensing means for dishwashing machines.

The term "detergent" as used herein is intended to embrace any material which would be employed in water solution or suspension during a washing cycle of the apparatus, whether this material consists essentially of inorganic salts having water softening or other functions, or whether it contains or consists of surface-active materials having a detergent function, such as soap or non-soap synthetics, or of substances containing both inorganic salts and surface-active materials. The detergents for use in connection with the apparatus of this invention will be water-soluble substances in powdered or granular form.

The term "liquid agent" as used herein is intended to embrace any suitable material in liquid form which will be employed during a washing or rinsing cycle of the machine. Wetting agents, water softeners, fabric softeners, detergents and bleaches constitute examples of the type of liquid agent contemplated herein.

The dispensing mechanism of the present invention comprises a detergent dispensing unit and a liquid dispensing unit. The detergent dispensing unit may be of any suitable type which is actuated by a rotatable shaft and cam assembly. For purposes of an exemplary showing, the detergent dispenser is illustrated and described as comprising a depressed portion in the inner lining of the door of a front opening dishwashing machine. A portion of the depression contains a hollow housing or cover member. A detergent receiving cup is pivotally mounted on a shaft passing through the door liner. The cup is rotatable in the depression between a detergent retaining position within the housing or cover member and a detergent dispensing position outside the housing or cover member. In use, the detergent receiving cup is filled with granulated material and manually rotated to its closed position within the cover member. The remainder of the door liner depression may then be filled with an additional increment of detergent. Movement of the dishwasher door from its horizontal open position to its vertical closed position will cause that increment of detergent lying in the depression to be discharged into the dishwasher vat ready for the first wash cycle. The detergent increment within the dispenser cup will be retained therein by the cover member. At an appropriate point in the machine cycle, the shaft will be rotated in such a way as to cause the detergent cup to move from its closed position to its exposed position discharging a second increment of detergent into the machine vat.

The liquid agent dispenser may be of any suitable type actuated by the longitudinal movement of a valve stem or plunger means. For purposes of an exemplary showing, the liquid agent dispenser is described and illustrated as comprising a liquid agent reservoir affixed to the dishwasher door between the outer wall and the inner liner thereof. The reservoir has a filling opening extending through the inner liner of the door and provided with suitable closure means.

The reservoir is connected through a first valve means to a metering chamber. The metering chamber is connected through a second valve means to an orifice outlet which also extends through the door liner.

The valve closure means for the first and second valves are affixed to a valve stem or plunger having two operative positions. In its first operative position, the first valve between the reservoir and the metering chamber is open and the second valve between the metering chamber and the outlet orifice is closed. In the second operative position of the plunger the first valve is closed and the second valve is open. Means are provided to hold the valve stem or plunger in its first operative position (with the first valve between the reservoir and the metering chamber opened and the second valve between the metering chamber and the outlet orifice closed). Upon actuation of the timer controlled release means, the valve will assume its second operative position, closing the first valve between the reservoir and the metering chamber and opening the second valve between the metering chamber and the outlet orifice, permitting the liquid agent in the metering chamber to exit via the outlet orifice into the machine vat.

The actuating and releasing means of the present invention comprises a single solenoid operatively connected to a release means comprising a pivotally mounted arm or link assembly. One end of this assembly contacts the plunger of the liquid agent dispensing unit and maintains it in its liquid agent retaining position. The other end of the arm or link assembly engages a stop on a cam assembly affixed to the rotatable shaft of the detergent dispensing unit. A pivoting of the arm or link assembly, caused by timer controlled actuation of the solenoid, results in the release of the detergent dispenser cam assembly and the consequent movement of the detergent cup from a detergent retaining to a detergent dispensing position. Simultaneously, the pivoting of the arm or link assembly will permit longitudinal movement of the plunger of the liquid agent dispensing unit, allowing the liquid agent in the metering chamber to enter the vat via the dispensing orifice. In this way, a single solenoid in combination with an arm or link assembly will bring about the simultaneous dispensing of detergent and liquid agent at a predetermined point in the machine cycle.

BRIEF DESCRIPTION OF THE DRAWINGS

FIGURE 1 is a partial perspective view of a front opening dishwashing machine with the door lowered.

FIGURE 2 is a front elevational view (partially in cross section) of the sequential detergent dispenser of the present invention, illustrating the detergent retaining and detergent dispensing positions of the dispenser cup.

FIGURE 3 is a cross sectional veiw taken along the section line 3—3 of FIGURE 2.

FIGURE 4 is a cross sectional view of the liquid agent dispensing unit.

FIGURE 5 is an exploded view of the dispensers and dispensing mechanism of the present invention.

FIGURE 6 is a top view of the dispensing mechanism of the present invention.

FIGURE 9 is a fragmentary rear elevational view similar to FIGURE 7, but illustrating the position of the cam assembly and release mechanism after the dispensing operation has taken place.

FIGURE 10 is a fragmentary rear elevational view similar to FIGURE 8, but illustrating the position of the cam assembly and release mechanism during manual return of the detergent cup to its detergent retaining position within the dispenser housing.

Figure 7:
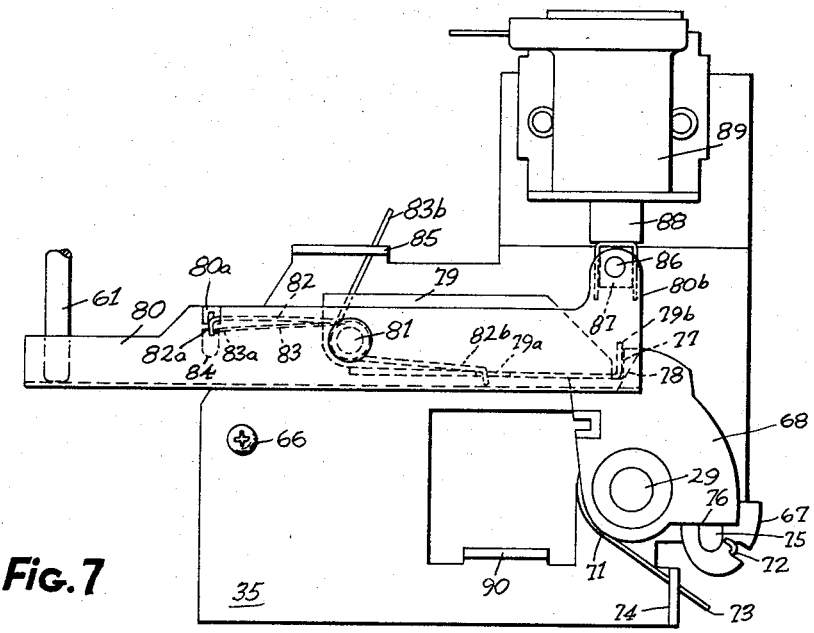
FIGURE 7 is a fragmentary rear elevational view of the dispensing mechanism of the present invention illustrating the detergent dispenser cam assembly and the release mechanism of the present invention in its normal, unactuated position.

DESCRIPTION OF THE PREFERRED
EMBODIMENTS

It will be understood by one skilled in the art that the operations of dishwashing machines include various washing cycles, rinsing cycles and drying cycles. The specific steps performed by the machine may be selectable by an operator by means of control devices; but the timing is accomplished and the order of performance of the steps is determined by one or more timing devices which are mechanical or electrical in nature. Many dishwashing machines are arranged so that they can perform a plurality of separate washing operations with intermediate rinsings. Since a washing cycle requires the presence of a detergent, and since the presence of a rinsing agent is desirable during a rinsing cycle, the apparatus of this invention is preferably arranged so that it can dispense a plurality of increments of detergent substance and liquid agent at different selected times.

The embodiment of this invention is, for purposes of an exemplary showing, described in connection with "undercounter" or "front opening" dishwashers. Such dishwashers are generally located under a sink counter or the like in a household kitchen, and are characterized by a downwardly opening front door. In FIGURE 1 there is shown a dishwashing machine having a body or casing 1, a front opening 2 and a downwardly opening door 3, shown in its open and substantially horizontal position. The dishwashing machine will be provided with various operating instrumentalities (not shown) including one or more timing devices for controlling the cycles of operation of the machine. No attempt has been made to outline the operating instrumentalities of the dishwashing machine, since these are well known in the art as comprising a motor, various valves, heating means and others.

It will be understood that the timing devices will be connected to these apparatus elements and to a source of power by flexible cables lying between inner and outer liners of the door and not shown in the drawing. The door 3 may also contain other instrumentalities such as a latch for holding the door in closed position, a safety switch for de-energizing the apparatus when the door is open and the like. The door 3 is provided with an inner lining generally indicated at 4, which in turn is provided with a substantially rectangular depressed area 5. The door lining may be of plastic material, or it may be a lining of metal, in which case it will normally be covered with a protective coating of enamel of some kind, unless the door lining is made of non-staining metal such as stainless steel. The visible parts of the detergent dispensing unit are indicated generally at 6, and are shown as mounted in the depressed area 5. The visible parts of the liquid agent dispensing unit are generally indicated at 7.

FIGURES 2 and 3 illustrate an exemplary form of detergent dispenser actuated by a rotating shaft. The inner liner 4 of the dishwasher door 3 is shown as provided with the depression 5. Located within this depression is a housing generally indicated at 8. The housing 8 has a top 9 with downwardly depending side walls 10 and 11, and a downwardly depending arcuate wall 12 terminating in a reinforced stop means 13. The housing 8 may be made of any suitable material such as pastic or the like, and is affixed to the door liner 4 by any suitable means such as screws (one of which is shown at 14).

The detergent dispenser further includes a segment-shaped detergent cup generally indicated at 15. The detergent cup may be made of any suitable material such as plastic or the like, and comprises a bottom 16, an arcuate side wall 17, and rectilinear side walls 18 and 19. Integral with the side wall 19 and a portion of the arcuate wall 17, there is a web 20 terminating in a reinforcing rib 21. The web 20 acts as a conduit for water when the cup 15 is closed, thereby serving to aid in keeping the detergent material dry, and preventing premature washout. The web 20 terminates in an arcuate surface 22 which coacts with the stop 13. The reinforcing rib 21 includes an extension 23 comprising a handle by which the detergent cup may be manually pivoted as described hereinafter.

The detergent cup walls 18 and 19, the web 20 and the reinforcing rib 21 terminate in an integral cylindrical portion of the cup generally indicated at 24. The cylindrical portion 24 is provided with a bore 25 including keyways 26 and 27. It may further be provided with an external pivot knob 28 cooperating with the top of the housing 8.

The detergent cup 15 is pivotally mounted by means of a shaft 29 in such a way as to be swingable between a detergent retaining position within the housing 8 and a detergent dispensing position outside of the housing 8 (as indicated in dotted lines in FIGURE 2).

One end of the shaft 29 is adapted to be received within the perforation 25 in the detergent cup, and may be provided with keys, or a pin 30 passing therethrough, the ends of which are receivable within keyways 26 and 27 respectively. The key and keyway assembly assures that the shaft and the detergent cup are non-rotatable with respect to each other.

The shaft 29 passes through a bushing 33 comprising a cylindrical portion 33a, an outwardly extending peripheral flange 33b and a cylindrical exteriorly threaded portion 33c. The shaft 29 has a first reduced portion 29a adapted to receive an annular bearing element 34 lying between the end of the bushing portion 33a and the detergent cup. The annular bushing portion 33b rests on the outer surface of the door liner 4 and the bushing portion 33c extends through a perforation in the door liner and a perforation in a bracket 35, to be described hereinafter. The annular portion 33b of the bushing may be partially undercut to accommodate an annular sealing means 36. The bushing is held in place by means of an annular internally threaded ring 37 engaging the exteriorly threaded bushing portion 33c. The shaft 29 may be provided with a second portion of reduced diameter 38 for the receipt of an O-ring 39 to insure that the shaft is sealed within the bushing 33.

FIGURE 4 is a cross sectional view of the liquid agent dispensing unit, generally indicated at 40. The dispensing unit includes a reservoir 41. The reservoir 41 has a plurality of integral spacing webs (two of which are shown at 42 and 43) which meet in a cylindrical element 44. The cylindrical element 44 has an interiorly threaded perforation 44a. The dispensing unit 40 is affixed to the door liner 4 by means of a machine screw 45 passing through a perforation in the door liner and into the threaded perforation 44a of the cylindrical element 44.

The dispenser 40 has an integral cylindrical portion 46 which extends through a perforation in the door liner 4 and is sealed therein by an annular resilient member 47. The cylindrical portion 46 has a web 48 extending thereacross. The web 48 contains a first opening 49 communicating with a cylindrical passage 50 which enters the reservoir. The opening 49 and cylindrical passage 50 constitute a filling orifice for the reservoir. The filling orifice may be closed by plug means 51 having a head portion 51a and a shank portion 51b. The shank may have a portion of reduced diameter 51c to accommodate an O-ring 52 to insure liquid tight sealing of the filling orifice. The cylindrical portion 50 may have an internal annular flange 53 containing diametrically opposed keyways (not shown) to accommodate key means 54 on the plug permitting the plug to be locked in place by a twisting action. The annular flange 53 may also have an integral stop (not shown) to limit the twisting action of plug 51 to 90°.

The reservoir 41 has an opening 55 communicating with a metering chamber 56. The metering chamber 56 has an opening 57 communicating with a dispensing chamber 58 and a dispensing orifice 58a in the web 48.

The reservoir opening 55 is closable by a first valve means 59. The opening 57 of the metering chamber is closable by a second valve means 60. The valve means 59 and 60 may be made of any suitable resilient material and are carried on a common valve stem or plunger 61.

The bottom of the dispensing chamber 58 is closed by a web 60a on the valve means 60. The web 60a is compressed about its periphery between the main body of the dispenser 40 and a bottom element 62. The element 62 is affixed to the dispenser body by any suitable means such as screws or the like (not shown). The element 62 has a central perforation 63 which serves both as a passage and a guide for the valve stem or plunger 61. The valve stem is urged downwardly by a spring 64. One end of the spring abuts against the element 62, the other end of the spring abuts against an annular member 65 affixed to the valve stem or plunger.

It will be understood by one skilled in the art that when the dishwashing machine door is in its open and substantially horizontal position, the plug 51 may be removed from the reservoir filling orifice, and the reservoir filled with liquid agent. The plug 51 is then replaced, sealing the filling orifice.

FIGURE 4 illustrates the position of the liquid agent dispensing unit when the dishwasher door is in its closed position. The figure further illustrates the plunger-valve assembly in its normal, non-dispensing, upward position. It will be noted that the valve element 59 is open, permitting liquid agent to pass from the reservoir through the opening 55 into the metering chamber. It will be understood that if the valve stem were to move downwardly, under the urging of the spring 64, the valve element 59 would close the opening 55 sealing the metering chamber from the reservoir. Simultaneously, the valve element 60 would open the opening 57 allowing liquid agent from the metering chamber to flow into the dispensing chamber 58, through the dispensing orifice 58a and into the machine vat.

FIGURES 5–8 illustrate the releasing mechanism by which the liquid agent and detergent dispensing units are actuated. Referring to FIGURES 5, 6 and 7, a bracket means 35 is suitably affixed to the inside surface of the door liner 4, as for example by screw 66. The bracket 35 is so configured as to accommodate the depressed portion 5 of the door liner. As indicated above with respect to FIGURE 3, the depressed portion 5 and the bracket are provided with coaxial and matching perforations through which the shaft 29 of the detergent dispenser and the threaded portion 33c of the bushing extend. The bushing 33 is held in place by the interiorly threaded ring 37 which is tightened against the bracket 35.

The end of the detergent dispenser shaft 29, which extends beyond the ring 37, is adapted to support suitable cam means. While the cam means may be of any known and appropriate type, the preferred embodiment is illustrated as having a double cam assembly of the type described in the above mentioned copending application Ser. No. 531,967.

Briefly, the double cam arrangement comprises a stop cam 67 and a release cam 68. The stop cam 67 is freely rotatable on the shaft 29, while the release cam 68 is nonrotatably affixed to the shaft 29 by any suitable means such as a pin 69. The stop cam 67 has a shoulder 70 upon which rides a spring 71. One end 72 of the spring 71 is engaged in a slot in the stop cam. The other end 73 of the spring is engaged by a lug 74 on the bracket 35. It will be noted that the spring 70 is so arranged as to urge the stop cam to rotate in a counterclockwise direction as seen in FIGURE 7. The stop cam has a lug 75 which engages a surface 76 on the release cam in such a way that when the stop cam rotates in a counterclockwise direction it forces the release cam to travel with it in the same direction. This, in turn, causes the shaft 29 to rotate, carrying the detergent cup with it. The stop cam 67 has a stop surface 77 normally engaged by a release means (as described hereinafter). The release cam has a release surface 78 which is so configured as to permit manual movement of the detergent cup from its detergent retaining position within the housing 8 to its detergent dispensing position, by causing the release means to be moved to its releasing position.

The release means of the present invention comprises a pair of channel-shaped arm members 79 and 80. The arm 79 is nested within the arm 80, and both arms are pivotally affixed to the bracket 35 by pivot pin 81. The pivot pin also holds two torsion springs 82 and 83. One end 82a of the spring 82 is engaged in a notch 80a in the arm 80, while the other end 82b of the spring is engaged in a perforation 79a in the arm 79. Thus, the spring 82 is loaded against the arm 80 and tends to pivot the arm 79 downwardly. The other spring 83 is engaged at one end 83a in a perforation 84 in the arm 80. The other end 83b of the spring 83 is engaged in a lug 85 on the bracket 35. The spring 83 is stronger than the spring 82 and tends to urge the rearward portion of the arm 80 upwardly against the plunger 61 of the liquid agent dispensing unit, and the spring 64 on the plunger. This arrangement of the springs and the cam 67 maintain the arms 79 and 80 in the relationship shown in FIGURE 7.

The forwardmost end of the arm 80 terminates in a pair of upstanding elements 80b and 80c. The upstanding elements 80b and 80c are provided with coaxial perforations engaged by a pin 86. The pin 86 is, in turn, engaged by a pin 87 mounted on the end of a core element 88 of a solenoid 89. The solenoid 89 is suitably mounted on the bracket 35. It will be understood by one skilled in the art that the solenoid is connected to and actuated by one of the above mentioned timing devices so that the solenoid is actuated at the proper time in the dishwashing cycle. The arm 79 has an upturned portion 79b at its forward end, engageable by the stop surface 77 of the stop cam and the release surface 78 of the release cam. The arm 80 has a slot 80d (FIGURE 5) at its forward end enabling contact of the forward end of arm 79 by cams 67 and 68.

The operation of the dispensing mechanism of the present invention may be described as follows. While the dishwasher door 3 is in its open and substantially horizontal position both the liquid agent unit and the detergent dispenser may be filled as described above. A full reservoir in the liquid agent dispenser unit should provide enough liquid agent for several months' usage.

Powdered or granulated detergent is placed in the detergent cup, and the detergent cup is manually rotated by means of the handle 23 to its detergent retaining position within the housing 8. That portion of the depression 5 normally occupied by the detergent cup when empty may then, itself, be filled with an increment of detergent. Once the dishwasher has been loaded with tableware and silverware to be cleaned, the door 3 may be moved to its vertical closed position. The increment of detergent located in the depression 5 will be discharged into the machine vat ready for the first washing cycle.

At the beginning of the machine cycle, the liquid agent dispensing unit plunger, the detergent dispenser cams, and the arms 79 and 80 will be in the position indicated in FIGURE 7. The valves 59 and 60 in the liquid agent dispenser will be in the positions shown in FIGURE 4.

Figure 8:
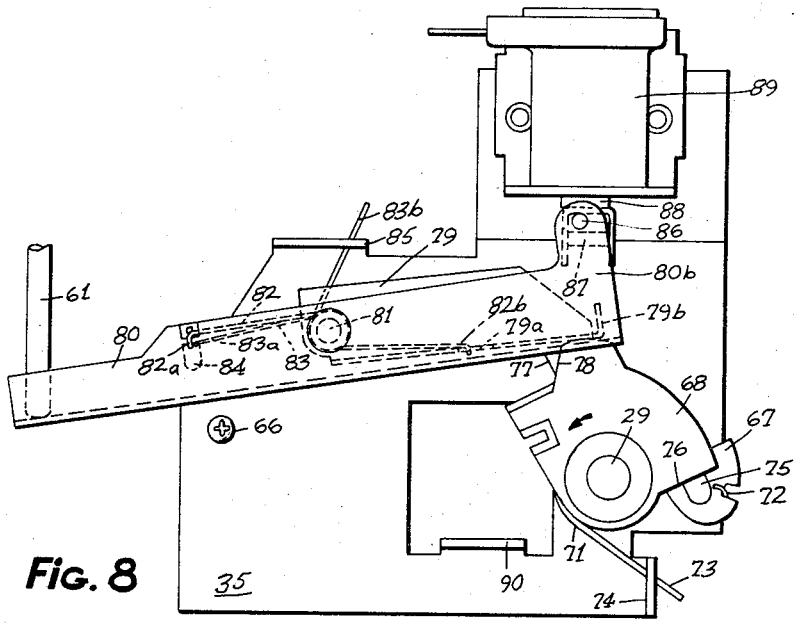
FIGURE 8 is a fragmentary rear elevational view similar to FIGURE 7 and illustrating the cam assembly and release mechanism of the present invention in its actuated position, during a dispensing operation.

At an appropriate time in the machine cycle, the timer mechanism will energize the solenoid 89, causing the core element 88 to be pulled upwardly. FIGURE 8 is similar to FIGURE 7, and like parts have been given like index numerals. FIGURE 8 illustrates the relative position of the parts at the time the solenoid 89 is actuated. Actuation of the solenoid by the timing device, resulting in an upward movement of the solenoid core 88, simultaneously results in an upward movement of the forward part of arm 80. As the arm 80 moves upwardly, it contacts the forward end of arm 79, causing arm 79 to move upwardly as well. The portion 79b of the arm 79 is disengaged from the stop surface 77 of the stop cam 67 so that the stop cam is free to rotate in a counterclockwise direction (indicated by the arrow) under the influence of cam spring 71. The stop cam, by virtue of the lug 75 will cause simultaneous rotation of the release cam 68, shaft 29 and detergent cup 15.

The upward movement of the forward part of the arm 80, pivoting about pin 81, will cause the rearward part of the arm 80 to rotate downwardly about the pin 81 and against the action of the spring 83. Downward movement of the rearward portion of the arm 80 will permit a downward movement of liquid agent dispensing unit plunger 61 under the influence of spring 64. The downward movement of plunger 61 will cause valve element 59 to close the opening 55 between the liquid agent dispensing, unit reservoir 41 and the metering chamber 56. Simultaneously the valve element 60 will open the opening 57 between the metering chamber and the dispensing chamber 58, enabling liquid in the metering chamber to pass into the machine vat via dispensing orifice 58.

FIGURE 9 is similar to FIGURES 7 and 8, and like parts have been given like index numerals. FIGURE 9 illustrates the relative positions of the parts upon de-energization of the solenoid 89. When the solenoid has been de-energized, the arms 79 and 80 will return to their horizontal relationship under the influence of springs 82 and 83. A stop means 90 may be affixed to the bracket 35, and so positioned as to stop the cams 67 and 68 so that the detergent cup 15 is held in its dispensing position (as illustrated in broken lines in FIGURE 2).

The torsion spring 83 is of sufficient strength to cause the arm 80 to bear upwardly against the plunger 61 and the spring 64 so that the valves 59 and 60 will return to the position illustrated in FIGURE 4. The openings 55 between the reservoir and metering chamber is open, and the opening 57 between the metering chamber and the dispensing chamber 58 is closed. The metering chamber will refill with liquid agent and the dispensing unit is ready again for release.

At the end of the machine cycle, the detergent cup will be in the position shown in broken lines in FIGURE 2, and the detergent dispenser cam assembly will be in the position shown in FIGURE 9. When the dishwashing machine is to be used again, it is only necessary to fill the detergent cup and return it to its detergent retaining position within the housing 8, which will simultaneously result in a clockwise rotation of the shaft 29 and release cam 68 (as seen in FIGURE 9). Contact between the release cam 68 and the lug 75 on the stop cam 67 will insure that the stop cam will simultaneously rotate in a clockwise direction until the cam assemblies assume the position shown in FIGURE 7.

FIGURE 10 is similar to FIGURES 7, 8 and 9, and again like parts have been given like index numerals. FIGURE 10 illustrates the relative position of the parts while the detergent cup is being returned to its detergent retaining position within the housing 8. The clockwise rotation of shaft 29 and cams 67 and 68 will cause an upward movement of arm 79 (independently of arm 80) until arm 79 achieves the position shown in FIGURE 7, against the stop surface 77 of cam 67.

If, for any reason, it is desired to manually move the detergent cup 15 from its detergent retaining position within the housing to its detergent dispensing position, the cam assembly will permit such movement. For example, the detergent cup 16 may have been inadvertently moved to its position within the housing 8 before it was filled. Should this occur, the cup may be manually grasped by the handle or lug 23 and moved to the position shown in broken lines in FIGURE 2. This in turn results in a counterclockwise movement of the cam assembly (as seen in FIGURE 7). The release surface 78 on the cam 68 will cause the arm 79 to move (independently of arm 80) upwardly and away from the stop surface 77 on the stop cam 67. Manual rotation of the detergent cup will result in rotation of the shaft 29 and the release cam 68, and the stop cam will simply follow under the influence of cam spring 71.

Thus it will be understood by one skilled in the art that the mechanism of the present invention is so designed as to prevent any actuation of the liquid agent dispensing unit by any manual movement of the detergent retaining cup. The liquid agent dispensing unit can only be actuated by the energizing of the solenoid 89.

While it is within the scope of the present invention to make reelase arms 79 and 80 an integral, one-piece structure, there are several advantages in making the release structure an articulated one. In the first place, tolerance and dimension variations in the manufacturing process will not affect the articulated structure since there is a limited amount of play between the forward ends of arms 79 and 80. Furthermore, it is imperative that the plunger and valve means of the liquid agent dispensing unit assume the position shown in FIGURE 4 after de-energization of the solenoid 89. If, for any reason, the plunger 61 should not move upwardly by a distance sufficient to fully close the valve 60, both the openings 55 and 57 would be open permitting a draining of the reservoir into the machine vat. Sufficient upward movement of the plunger 61 is assured by the provision of an articulated structure, the spring loading of the arm 80 by torsion spring 83, and the utilization of the relative movement of the arms allowed by the space between the two arms. FIGURE 6 illustrates the relative position of the arms 79 and 80 after de-energization of the solenoid 89. Should the valve element 60 in the liquid agent dispenser become worn, so that additional upward movement of the plunger was required to assure a fully seated position of the valve element 60, it will be noted that (FIGURE 6) the arm 80 may move upwardly under the influence of spring 83 by the required additional distance.

Finally, the making of arms 79 and 80 as independent structures enables the above mentioned manual movement of detergent cup 15 without actuation of the liquid agent dispenser.

Modifications may be made in the invention without departing from the spirit of it.

The embodiments of the invention in which an exclusive property or privilege is claimed are defined as follows:

1. A liquid agent and detergent dispensing mechanism comprising a plunger operated liquid agent dispenser and a detergent dispenser operated by cam means, said plunger being movable between a liquid agent retaining position and a liquid agent dispensing position, means for urging said plunger to said liquid agent dispensing position, said cam means being rotatable between a detergent retaining position and a detergent dispensing position, means for urging said cam means to said detergent dispensing position, pivotally mounted arm means, one end of said arm means engaging said plunger, the other end of said arm means engageable with said cam means, said arm means having an unactuated position, wherein it maintains said plunger in said liquid agent retaining position against the action of said plunger urging means and wherein it is capable of maintaining said cam means in said detergent retaining position against the action of said cam urging means, said arm means having an actuated position, wherein said plunger and cam means are released to move to their respective liquid agent and detergent dispensing positions under the influence of said plunger urging means and cam urging means respectively, said arm means being pivotable between said unactuated and said actuated positions, and actuating means for pivoting said arm means between said actuated and unactuated positions.

2. The structure claimed in claim 1 including means for urging said arm means to said unactuated position.

3. The structure claimed in claim 1 wherein said actuating means comprises a timer controlled solenoid.

4. The structure claimed in claim 1 wherein said arm means comprises a first arm and a second arm, a pivot pin, said first arm pivotally mounted on said pin, one end of said first arm engaging said plunger, the other end of said first arm being operatively connected to said actuating means, one end of said second arm being pivotally mounted on said pivot pin, the free end of said second arm being engageable with said cam means, said free end of said second arm also being engageable by said first arm whereby pivoting of said first arm from said unactuated position to said actuated position will cause movement of said second arm from said unactuated position to said actuated position.

5. The structure claimed in claim 4 including a first resilient means biasing said first arm to said unactuated position and a second resilient means biasing said second arm to said unactuated position.

6. The structure claimed in claim 4 wherein said second arm is pivotal from said unactuated position to said actuated position independently of said first arm whereby to permit manual movement of said cam means between said detergent retaining and detergent dispensing positions independently of said plunger.

7. The structure claimed in claim 4 wherein said first and second arms each have a channel-shaped cross section, said second arm located within said first arm, said first arm having a slot adjacent said free end of said second arm whereby to permit said engagement of said cam means by said free end of said second arm.

8. The structure claimed in claim 6 wherein said liquid agent dispenser comprises a reservoir, a metering chamber and a dispensing chamber, first valve means between said reservoir and said metering chamber, second valve means between said metering chamber and said dispensing chamber, said first and second valve means being operatively affixed to said plunger.

9. The structure claimed in claim 6 including a shaft, a portion at least of said detergent dispenser being fixedly secured to said shaft, said shaft and said dispenser portion having detergent retaining and detergent dispensing positions corresponding respectively to said retaining and dispensing positions of said cam means, said cam means comprising a first cam and a second cam, said first cam being rotatively mounted on said shaft, said second cam being fixedly secured to said shaft, said urging means comprising resilient means urging said first cam from said detergent retaining to said detergent dispensing position, means on said first cam for engaging and rotating said second cam and said shaft and portion at least of said detergent dispenser when said first cam is rotated from said detergent retaining to said detergent dispensing position, surfaces on said first and second cams for engagement by said free end of said second arm to maintain said cams in said detergent retaining position, and means on said second cam for releasing said engagement when said dispenser portion and said shaft are manually rotated from said detergent retaining to said detergent dispensing position.

References Cited

UNITED STATES PATENTS 2,948,437   8/1960   Nielsen _____ 222—70
3,028,051   4/1962   Jacobs _____ 222—134 X ROBERT B. REEVES, *Primary Examiner.*

H. S. LANE, *Assistant Examiner.*